United States Patent
Guan et al.

(10) Patent No.: US 9,412,048 B2
(45) Date of Patent: Aug. 9, 2016

(54) SYSTEMS AND METHODS FOR COOKWARE DETECTION

(71) Applicant: General Electric Company, Schenectady, NY (US)

(72) Inventors: Li Guan, Clifton Park, NY (US); Charles Ray Smith, Simpsonville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 222 days.

(21) Appl. No.: 14/257,282

(22) Filed: Apr. 21, 2014

(65) Prior Publication Data

US 2015/0300652 A1 Oct. 22, 2015

(51) Int. Cl.
*G06K 9/00* (2006.01)
*G06K 9/62* (2006.01)
*G06T 7/00* (2006.01)
*F24C 7/08* (2006.01)

(52) U.S. Cl.
CPC ............. *G06K 9/627* (2013.01); *F24C 7/083* (2013.01); *G06K 9/00624* (2013.01); *G06T 7/0018* (2013.01); *G06K 2209/17* (2013.01)

(58) Field of Classification Search
None
See application file for complete search history.

(56) References Cited

U.S. PATENT DOCUMENTS

| | | | |
|---|---|---|---|
| 6,301,521 B1 | 10/2001 | Chen et al. | |
| 6,999,614 B1 | 2/2006 | Bakker | |
| 8,079,079 B2 * | 12/2011 | Zhang | G06F 21/32 706/48 |
| 8,439,683 B2 | 5/2013 | Puri et al. | |
| 8,861,884 B1 | 10/2014 | Fang | |
| 8,934,709 B2 | 1/2015 | Saptharishi | |
| 2007/0064107 A1 | 3/2007 | Aggarwal | |
| 2009/0087027 A1 | 4/2009 | Eaton | |
| 2009/0132530 A1 | 5/2009 | Chen | |
| 2010/0119755 A1 * | 5/2010 | Chung | B29C 59/021 428/36.91 |
| 2010/0158356 A1 | 6/2010 | Ranzato et al. | |
| 2010/0182136 A1 | 7/2010 | Pryor | |
| 2010/0231506 A1 | 9/2010 | Pryor | |
| 2011/0253693 A1 * | 10/2011 | Lyons | A47J 27/00 219/209 |
| 2013/0142417 A1 | 6/2013 | Kutliroff | |
| 2013/0228564 A1 | 9/2013 | Jungbauer | |

(Continued)

FOREIGN PATENT DOCUMENTS

| | | |
|---|---|---|
| CN | 102121906 | 7/2011 |
| EP | 1 505 350 A2 | 2/2005 |
| JP | 2003307311 | 10/2003 |

OTHER PUBLICATIONS

Han et al., "Boiler Flame Image Classification Based on Hidden Markov Model," IEEE, 1-4244-0497-5/06, Jul. 9-12, 2006, Montreal, Quebec, Canada, pp. 575-578.

*Primary Examiner* — Shefali Goradia
(74) *Attorney, Agent, or Firm* — Dority & Manning, P.A.

(57) ABSTRACT

Systems and methods for cookware detection are provided. One example system includes a vision sensor positioned so as to collect imagery depicting a cooktop. The system includes one or more processors and one or more non-transitory computer-readable media storing instructions that, when executed by the one or more processors, cause the one or more processors to perform operations. The operations include obtaining a frame of imagery depicting the cooktop and using a classifier to classify the frame of imagery as either depicting cookware or not depicting cookware. When the frame is classified as depicting cookware, the operations include performing one or more operations in response to the detected cookware.

20 Claims, 4 Drawing Sheets

(56) References Cited

U.S. PATENT DOCUMENTS

| | | |
|---|---|---|
| 2013/0229346 A1 | 9/2013 | Jungbauer |
| 2013/0243241 A1 | 9/2013 | Shaick |
| 2014/0270358 A1 | 9/2014 | Zhu |
| 2014/0334734 A1 | 11/2014 | Xiong |
| 2015/0286891 A1 * | 10/2015 | Guan .................... G06T 7/0048 382/168 |

* cited by examiner

SYSTEMS AND METHODS FOR COOKWARE DETECTION

FIELD OF THE INVENTION

The present disclosure relates generally to systems and methods for cookware detection. More particularly, the present disclosure is directed to systems and methods for cookware detection in which a binary classifier analyzes imagery of a cooktop captured by a vision sensor to detect the presence of cookware on the cooktop.

BACKGROUND OF THE INVENTION

In many situations it is desirable to know whether or not an item of cookware is present upon a cooktop. For example, knowledge of the presence or absence of cookware on a cooktop can be used to increase user safety, reduce energy expenditure, and/or perform other "smart" operations.

However, certain existing systems for detecting the presence of cookware suffer from various drawbacks. As an example, a motion sensor can be used to detect motion around the cooktop. However, detection of motion does not provide precise information as to whether an item of cookware is present on the cooktop. For example, a user may be operating an adjacent appliance and cause the motion sensor to provide a false positive for cookware detection.

As another example, a pressure sensor can be used to detect the presence of an object placed upon the cooktop. However, detection of an object does not necessarily provide accurate cookware detection either. For example, a pet such as a cat may be sitting on the cooktop and trigger a false cookware detection.

As yet another example, specialized cookware may be used that has built-in circuitry or other sensors that communicate with the cooktop or other appliances to indicate the presence of the cookware. However, such specialized cookware can be too expensive for an average user to find desirable. Alternatively, the user may already have an existing set of cookware and therefore be reluctant to purchase additional specialized cookware.

Therefore, systems and methods for cookware detection that provide improved accuracy without significantly increasing cost are desirable.

BRIEF DESCRIPTION OF THE INVENTION

Additional aspects and advantages of the invention will be set forth in part in the following description, or may be apparent from the description, or may be learned through practice of the invention.

One aspect of the present disclosure is directed to a system for detecting cookware. The system includes a vision sensor positioned so as to collect imagery depicting a cooktop. The system includes one or more processors and one or more non-transitory computer-readable media storing instructions that, when executed by the one or more processors, cause the one or more processors to perform operations. The operations include obtaining a frame of imagery depicting the cooktop and using a classifier to classify the frame of imagery as either depicting cookware or not depicting cookware. When the frame is classified as depicting cookware, the operations include performing one or more operations in response to the detected cookware Another aspect of the present disclosure is directed to a method for detecting cookware. The method includes collecting, by a vision sensor, one or more frames comprising imagery depicting a cooktop. The method includes classifying, by a binary classifier, each of the one or more frames as either depicting an item of cookware or not depicting an item of cookware. The method includes, when at least one of the frames is classified as depicting an item of cookware, performing one or more operations responsive to the detected item of cookware.

Another aspect of the present disclosure is directed to a device for detecting cookware. The device includes a camera positioned so as to collect a plurality of images of a cooktop. The device includes a classifier module implemented by one or more processors. The classifier module is configured to calculate a cookware score for each of the plurality of images and to use the cookware score for each of the plurality of images to classify such image as either depicting cookware or not depicting cookware.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
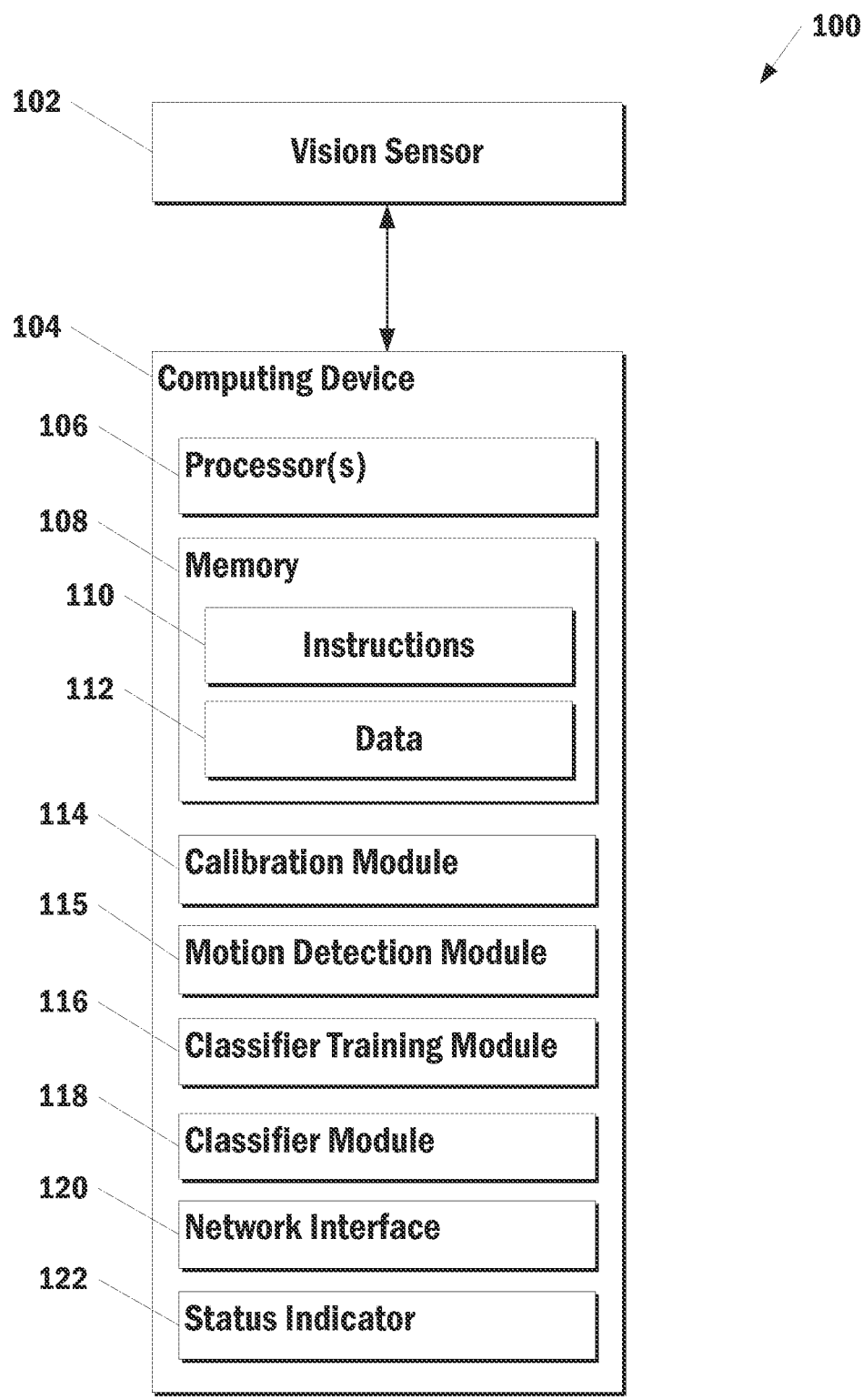
FIG. 1 depicts an example system according to an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

With reference now to the FIGS., example embodiments of the present disclosure will be discussed in further detail. FIG. 1 depicts an example system 100 according to an example embodiment of the present disclosure.

System 100 can include a vision sensor 102 that can exchange data with a computing device 104. As an example, the vision sensor 102 can be any suitable camera for capturing imagery. For example, in some embodiments, the vision sensor 102 can be a wide-angle lens VGA resolution video camera.

Figure 2:
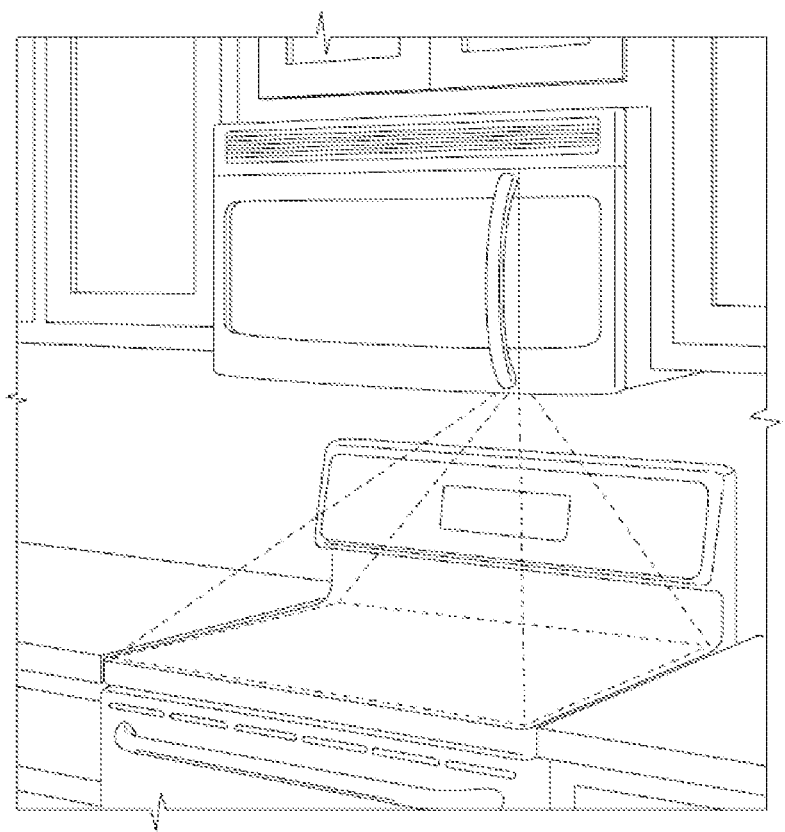
FIG. 2 depicts an example vision sensor capturing imagery depicting a cooktop according to an example embodiment of the present disclosure.

Vision sensor 102 can be positioned so as to collect imagery depicting a cooktop. For example, vision sensor 102 can be secured to the underside of an over the range microwave or hood and pointed downwards so that the view of the vision sensor generally corresponds to the dimensions of the cooktop. Other positions may be used as well. As an example, FIG. 2 depicts an example vision sensor capturing imagery depicting a cooktop according to an example embodiment of the present disclosure.

Referring again to FIG. 1, vision sensor 102 can collect a plurality of frames of imagery. For example, in some embodiments, computing device 104 can operate vision sensor 102 to collect about thirty frames per second of a VGA resolution video stream. The frame rate can be modifiable by the computing device 104.

Computing device 104 can be any device that includes one or more processors 106 and a memory 108. As an example, in some embodiments, computing device 104 can be a single board computer (SBC). For example, the computing device 104 can be a single System-On-Chip (SOC). Further, the vision sensor 102 can also be located on the same single circuit board. However, any form of computing device 104 can be used to perform the present disclosure.

The processor(s) 106 can be any suitable processing device, such as a microprocessor, microcontroller, integrated circuit, or other suitable processing devices or combinations thereof.

The memory 108 can include any suitable storage media, including, but not limited to, non-transitory computer-readable media, RAM, ROM, hard drives, flash drives, accessible databases, or other memory devices. The memory 108 can store information accessible by processor(s) 106, including instructions 110 that can be executed by processor(s) 106 to perform aspects of the present disclosure.

Memory 108 can also include data 112. Data 112 can store various types of information. In some embodiments, data 112 can store a positive training image dataset containing a plurality of images depicting cookware and a negative image training dataset containing a plurality of images that do not depict cookware.

As another example, in some embodiments, data 112 can store a plurality of feature criteria with respect to which an image is analyzed to assist in classifying the image as either depicting cookware or not depicting cookware. For example, data 112 can include a plurality of high-dimensional planes respectively associated with the plurality of feature criteria that describes the image appearance of the two classes to be separated. The plurality of planes can be predetermined and loaded into memory 108 by the manufacturer of system 100, or can be periodically re-determined and stored in memory 108 by a classifier training module 116, as will be discussed further below.

Computing device 104 can also include a number of modules to provide functionality or otherwise perform particular operations. It will be appreciated that the term "module" refers to computer logic utilized to provide desired functionality. Thus, a module can be implemented in hardware, application specific circuits, firmware and/or software controlling a general purpose processor. In one embodiment, modules are program code files stored on the storage device, loaded into memory and executed by a processor or can be provided from computer program products, for example computer executable instructions, that are stored in a tangible computer-readable storage medium such as RAM, hard disk or optical or magnetic media.

In some embodiments, computing device 104 can include a calibration module 114. Computing device 104 can implement calibration module 114 to identify one or more locations respectively associated with one or more burners included in a cooktop. For example, calibration module 114 can be implemented to identify the one or more locations respectively associated with the one or more burners by comparing reference imagery depicting the cooktop without objects placed thereon with calibration imagery depicting the cooktop with one or more objects respectively placed on the one or more burners.

As another example, calibration module 114 can be implemented to identify the one or more locations respectively associated with the one or more burners by comparing reference imagery depicting the cooktop without objects placed thereon with calibration imagery depicting the cooktop with one or more of the burners energized. For example, the calibration module 114 can detect the presence of a flame or other appearance change due to energization of the burners (e.g. glowing red).

In some embodiments, computing device 104 can also include a motion detection module 115. Motion detection module 115 can be implemented to compare two frames of imagery (e.g. consecutive frames) to determine whether the frames depict motion occurring in the depicted environment.

In some embodiments, computing device 104 can include a classifier training module 116. Classifier training module 116 can be implemented to train a classifier module 118.

In particular, as an example, computing device 104 can implement classifier training module to analyze a positive training image dataset and a negative training image dataset to identify a plurality of image feature criteria that can be used to train a classifier module 118. For example, classifier training module 116 can be implemented to analyze the training image datasets to extract a plurality of image feature descriptors such as, for example, a Pyramid Histogram of Visual Words. The classifier training module 116 can then generate a codebook from the feature descriptors.

As another example, a plurality of planes can be respectively determined for the plurality of feature criteria. The plane for each feature criterion can represent an optimal separation between the sets of data points for the two classes for such feature criterion. For example, the planes can provide the largest distance to the nearest training data point of either class.

Computing device 104 can implement classifier module 118 to classify an image into one of a plurality of classes. In some embodiments, classifier module 118 can a binary classifier that classifies imagery captured by vision sensor 102 as either depicting an item of cookware or not depicting an item of cookware. For example, classifier module 118 can be a support vector machine or a random forest classifier.

As an example, in some embodiments, classifier module 118 can retrieve from memory 108 a plurality of planes respectively associated with a plurality of feature criteria and use the plurality of planes to classify an image as either depicting cookware or not depicting cookware. For example, classifier module 118 can use the plurality of planes to calculate a cookware score for a given image. The image can then be classified on the basis of the cookware score.

In further embodiments, classifier training module 116 can periodically re-train classifier module 118 on the basis of additional imagery collected by system 100. For example, additional imagery depicting cookware can be collected during a calibration phase or during standard operations. The additional imagery can be added to positive training image dataset. Classifier training module 116 can then re-train classifier module 118.

In some embodiments, computing device 104 can include a network interface 120. Network interface 120 can include any circuitry or components for communication over a network (e.g. a local area network or a wide area network). For example, computing device 104 can use network interface 120 to communicate with a cooktop appliance to provide the cooktop appliance with an indication of the presence and location of one or more items of cookware detected on the cooktop.

The cooktop appliance can use such information to provide enhanced safety features. For example, the cooktop appliance can energize a burner only when it receives an indication from computing device 104 that an item of cookware is located at such burner.

Computing device 104 can also include a status indicator 122. Status indicator 122 can be any suitable component or grouping of components for providing a status indicating whether cookware has been detected. As an example, status indicator 122 can include one or more light emitting devices (e.g. LEDs) that illuminate or flash upon detection of cookware or one or more speakers for providing an audible indication upon detection of cookware.

Computing device 104 can include other functionality as well. For example, in some embodiments, computing device 104 can include further modules for performing boil detection. In such embodiments, the computing device may analyze imagery for boil detection only after an item of cookware is detected at the cooktop.

Figure 3:
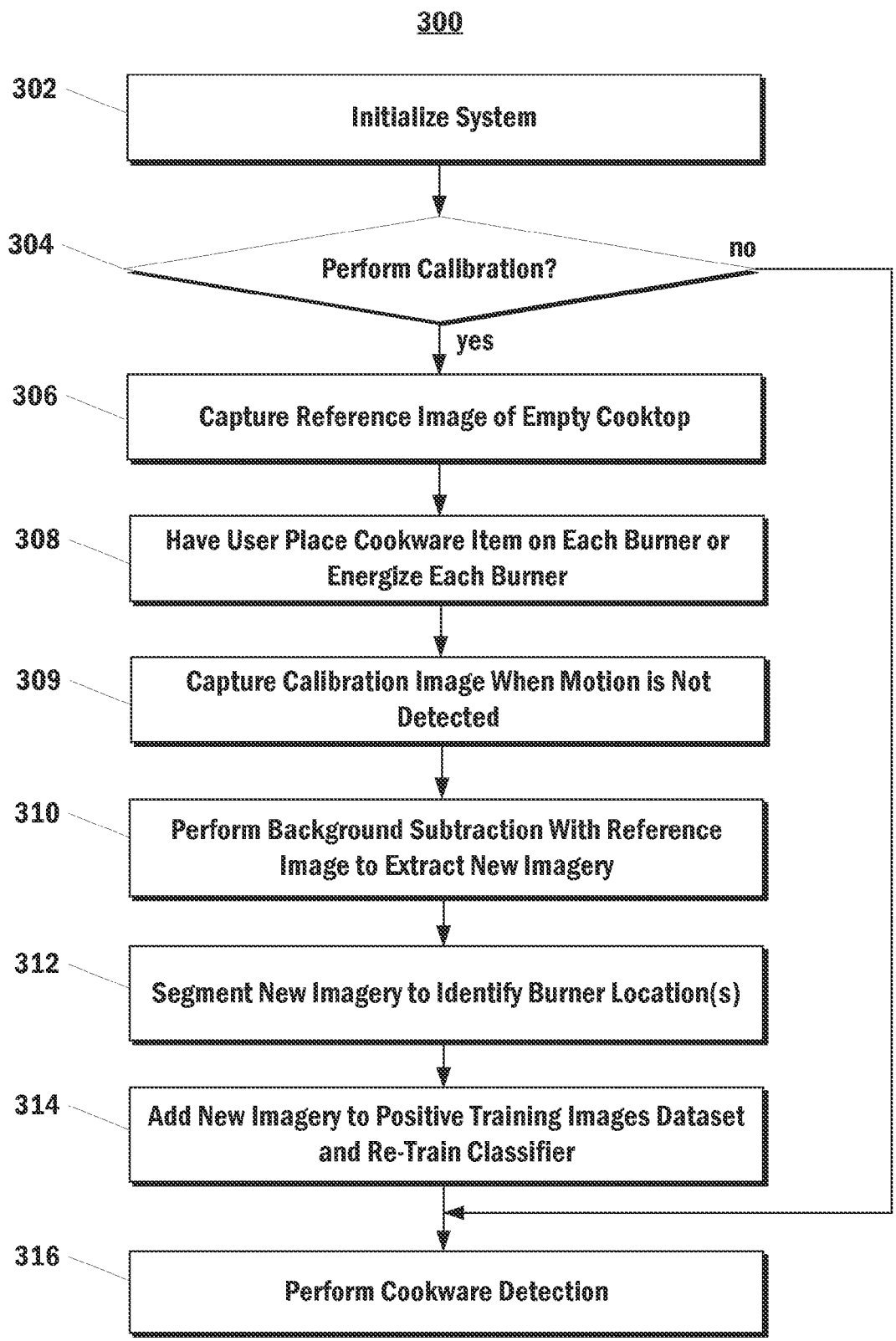
FIG. 3 depicts a flow chart of an example method for calibrating a system according to an example embodiment of the present disclosure.

FIG. 3 depicts a flow chart of an example method (300) for calibrating a system according to an example embodiment of the present disclosure. Although method (300) will be discussed with reference to system 100 of FIG. 1, method (300) can be performed by any suitable system.

In addition, FIG. 3 depicts steps performed in a particular order for purposes of illustration and discussion. Those of ordinary skill in the art, using the disclosures provided herein, will understand that the various steps of method (300) can be omitted, adapted, and/or rearranged in various ways without departing from the scope of the present disclosure.

At (302) the system can be initialized. For example, system 100 may receive power or otherwise be turned on.

At (304) it can be determined whether a calibration routine should be performed. As an example, in some embodiments, system 100 can be configured so that it performs a calibration routine upon its first system initialization after installation. Therefore, at (304) it can be determined whether a calibration routine has previously been performed (e.g. by checking a flag). If a routine has not yet been performed, then it may be appropriate to perform the calibration routine.

If it is determined at (304) that a calibration routine should not be performed, then method (300) can proceed to (316) and perform standard operations, such as collecting imagery and performing a cookware detection algorithm with respect to such imagery.

However, if it is determined at (304) that a calibration routine should be performed, then method (300) can proceed to (306).

At (306) a reference image of the cooktop without any objects placed thereon can be captured. For example, computing device 104 can operate vision sensor 102 to collect the reference image. The reference image can be stored in memory 108 for later use.

In some embodiments, system 100 can further include a display that provides visual instructions to the user or a speaker that provides audio instructions to the user so that the calibration process can be performed. In other embodiments, the system 100 can simply perform the calibration process and expect that the user will be provided with instructions independently (e.g. via a written manual provided with the product).

At (308) cookware items can be placed on one or more of the burners. Alternatively, one or more of the burners can be energized.

In particular, the calibration image should include new imagery at the locations of the burners so that the locations of the burners can be identified by comparing the reference image with the calibration image. Therefore, placing cookware on one or more of the burners will result in such new imagery being depicted by the calibration image. Likewise, energizing the burners can cause the burners to glow with heat, thereby providing new imagery. As yet another example, objects (e.g. pieces of paper or plastic) that are visually different than the burner surfaces can be placed on the burner to provide new imagery to be captured in the calibration image.

At (309) a calibration image can be captured when motion is not detected at the cooktop. For example, motion detection module 115 can be implemented to determine whether there is any motion between two consecutive frames of imagery. In particular, the new imagery included in the calibration image used for burner localization should include only the object(s) newly stationed on the burner(s) or the appearance change of the energized burner(s), but not human hands or other objects in motion while transitioning from the empty cooktop to the covered or energized cooktop used for calibration. Therefore, at (309) a plurality of frames of imagery captured by the vision sensor can be analyzed to determine when no motion is detected. When no motion is detected, the calibration image can be captured (e.g. the most recently captured frame can be used as the calibration image).

At (310) background subtraction can be performed for the calibration image captured at (309) with respect to the reference image captured at (306), such that the new imagery can be located.

At (312) the new imagery can be segmented to identify one or more locations respectively associated with the one or more burners.

In some embodiments, steps (308) through (310) are performed for each of a plurality of burners. Thus, for example, if there are four burners included in the cooktop, then four calibration images can be captured that respectively depict new imagery at the respective burner locations. Each calibration image can be compared with the reference image to identify one of the burner locations. As such, segmentation at step (312) is not needed.

Optionally, at (314) the new imagery can be added to a positive training images dataset and a classifier can be retrained. For example, in the instance that the calibration images depict cookware at one or more of the burner locations, the new imagery extracted at (310) for such burner locations can be added to the positive training images dataset and classifier training module 116 can re-train classifier module 118.

However, as previously discussed, classifier training module 116 is not present in some embodiments of the present disclosure. Therefore, in such embodiments, step (314) can be omitted.

After (314) method (300) can proceed to (316) and perform standard operations, such as collecting imagery and performing a cookware detection algorithm with respect to such imagery.

Figure 4:
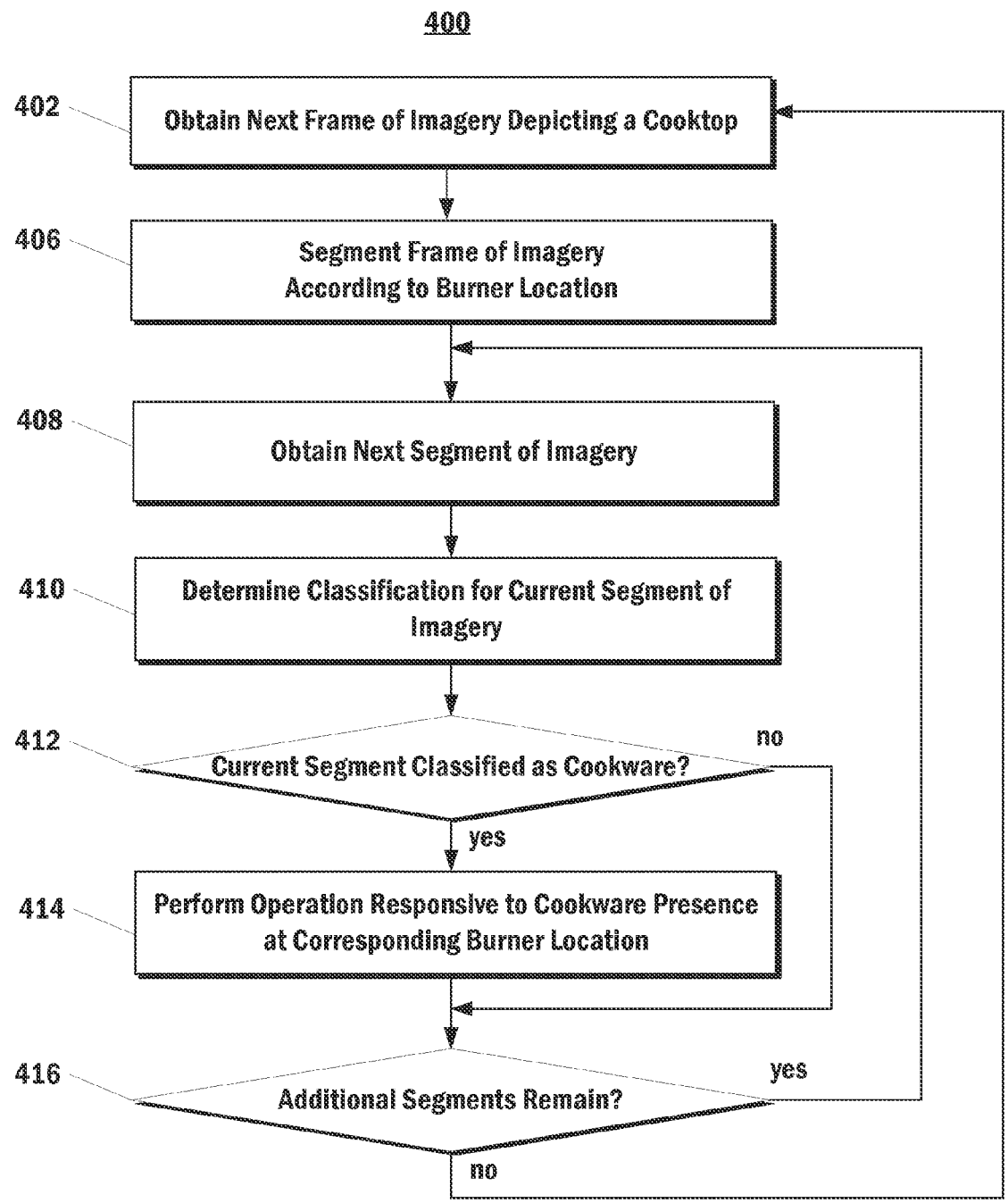
FIG. 4 depicts a flow chart of an example method for detecting cookware according to an example embodiment of the present disclosure.

FIG. 4 depicts a flow chart of an example method (400) for detecting cookware according to an example embodiment of the present disclosure. Although method (400) will be discussed with reference to system 100 of FIG. 1, method (400) can be performed by any suitable system.

In addition, FIG. 4 depicts steps performed in a particular order for purposes of illustration and discussion. Those of ordinary skill in the art, using the disclosures provided herein, will understand that the various steps of method (400) can be omitted, adapted, and/or rearranged in various ways without departing from the scope of the present disclosure.

At (402) the next frame of imagery depicting the cooktop can be obtained. For example, vision sensor 102 can be operated to capture a stream of frames of imagery. At (402) computing device 104 can obtain the next frame of imagery from the stream.

At (406) the frame of imagery obtained at (402) can be segmented according to burner location. For example, computing device 104 may have knowledge of the respective locations of one or more burners due to, for example, performance of a calibration routine. Thus, at (406) the frame of imagery obtained at (402) can be segmented into a plurality of segments based on such burner locations.

For example, the frame of imagery can be cropped into segments directly corresponding to the burner locations. Each of such segments of imagery can be associated with the burner at the corresponding location.

In some embodiments, a calibration process may not have been previously performed to identify the burner locations. In such embodiments, background subtraction can be performed for the frame obtained at (402) with respect to a reference image depicting the cooktop without any objects placed thereon, such that new imagery can be extracted. The new imagery can then be segmented to identify one or more segments that respectively correspond to one or more burner locations.

At (408) the next segment of new imagery can be obtained. For example, each segment can be considered individually. Therefore, at (408) the next segment can be obtained and considered.

At (410) a classification can be determined for the segment of imagery most recently obtained at (408). As an example, computing device 104 can implement classifier module 118 to classify the segment as either depicting cookware or not depicting cookware.

In particular, in some embodiments, classifier module 118 can calculate a cookware score for the segment. The cookware score can be based on application of a plurality of feature criteria to the segment. For example, the a plurality of planes respectively associated with the plurality of feature criteria can be used to generate the cookware score. Classifier module 118 can then classify the segment on the basis of the cookware score (e.g. by comparing to a threshold score).

At (412) it can be determined whether the current segment of imagery was classified as depicting cookware. If it is determined at (412) that the current segment of imagery was classified as depicting cookware, then at (414) one or more operations can be performed. The performed operations can be responsive to the presence of cookware at the corresponding burner location.

As an example, the one or more operations performed at (414) can include providing an status indication. For example, computing device 104 can operate status indicator 122 to provide an audio indication or a visual indication that cookware has been detected.

As another example, the operations performed at (414) can include transmitting a communication to the cooktop that informs the cooktop of the presence of the detected cookware. The communication can identify one or more of a plurality of burners included in the cooktop upon which the detected cookware is positioned.

However, referring again to (412), if it is determined that the current segment of imagery was not classified as depicting cookware, then method (400) can proceed to (416).

At (416) it can be determined whether additional segments of imagery remain unclassified. If it is determined at (416) that additional segments of imagery remain, then method (400) can return to (408) and obtained the next segment of new imagery. In such fashion, each segment of new imagery identified at (406) can be individually considered and classified. In such fashion, cookware detection can be performed on a burner-by-burner basis.

Furthermore, it will be understood that, in some embodiments, step (416) can be performed prior to (414), such that the presence of cookware can be determined for each burner prior to performing responsive operations.

However, if it is determined at (416) that additional segments of imagery do not remain, then method (400) can return to (402) and obtain the next frame of imagery depicting the cooktop. In such fashion, a stream of images collected by the vision sensor can be individually analyzed and classified to detect cookware.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for detecting cookware, the system comprising:
   a vision sensor positioned so as to collect imagery depicting a cooktop;
   one or more processors; and
   one or more non-transitory computer-readable media storing instructions that, when executed by the one or more processors, cause the one or more processors to perform operations, the operations comprising:
   obtaining a frame of imagery depicting the cooktop;
   performing background subtraction for the frame of imagery with respect to a reference frame of imagery depicting the cooktop without any objects placed thereon;
   after performing the background subtraction for the frame of imagery, using a classifier to classify the frame of imagery as either depicting cookware or not depicting cookware; and
   when the frame is classified as depicting cookware, performing one or more operations in response to the detected cookware.

2. The system of claim 1, wherein the operations further comprise, prior to using the classifier to classify the frame of imagery as either depicting cookware or not depicting cookware, calibrating the system to identify one or more locations respectively associated with one or more burners included in the cooktop.

3. The system of claim 2, wherein calibrating the system to identify one or more locations respectively associated with one or more burners included in the cooktop comprises:

obtaining a reference frame of imagery depicting the cooktop without any objects placed thereon;

obtaining one or more calibration frames of imagery depicting the cooktop with one or more objects respectively positioned at the one or more locations respectively associated with the one or more burners;

performing background subtraction for the one or more calibration frames of imagery with respect to the reference frame of imagery to identify the one or more locations.

4. The system of claim 3, wherein:

the one or more calibration frames of imagery comprise a single calibration frame of imagery;

the one or more objects respectively positioned at the one or more locations respectively associated with the one or more burners comprise a plurality of objects respectively positioned at a plurality of locations respectively associated with a plurality of burners included in the cooktop; and performing background subtraction for the single calibration frame of imagery with respect to the reference frame of imagery further comprises performing object segmentation to identify the plurality of locations.

5. The system of claim 2, wherein calibrating the system to identify one or more locations respectively associated with one or more burners included in the cooktop comprises:

obtaining a reference frame of imagery depicting the cooktop without any objects placed thereon;

obtaining one or more calibration frames of imagery depicting the cooktop with the one or more burners energized;

performing background subtraction for the one or more calibration frames of imagery with respect to the reference frame of imagery to identify the one or more locations.

6. The system of claim 1, wherein:

the operations further comprise segmenting the frame of imagery according to a plurality of burner locations respectively associated with a plurality of burners included in the cooktop, such that a plurality of frame segments of formed that respectively correspond to the plurality of burners; and using the classifier to classify the frame of imagery as either depicting cookware or not depicting cookware comprises using the classifier to individually classify each of the plurality of frame segments as either depicting cookware or not depicting cookware, such that cookware detection is performed on a burner-by-burner basis.

7. The system of claim 1, wherein the classifier comprises a support vector machine.

8. The system of claim 1, wherein one or more operations in response to the detected cookware comprise performing a boil detection algorithm.

9. The system of claim 1, wherein one or more operations in response to the detected cookware comprise transmitting a communication to the cooktop that informs the cooktop of the presence of the detected cookware.

10. The system of claim 9, wherein the communication further identifies one or more of a plurality of burners included in the cooktop upon which the detected cookware is positioned.

11. The system of claim 1, wherein:

the vision sensor comprises a wide angle VGA resolution camera; and the one or more processors and the one or more non-transitory computer-readable media comprise a single System-On-Chip.

12. A method for detecting cookware, the method comprising:

collecting, by a vision sensor, one or more frames comprising imagery depicting a cooktop;

segmenting each of the one or more frames into a plurality of frame segments based on a plurality of locations respectively associated with a plurality of burners included in the cooktop;

classifying, by a binary classifier, each of the plurality of frame segments as either depicting an item of cookware or not depicting an item of cookware, such that cookware detection is performed on a burner-by-burner basis; and when at least one of the frame segments is classified as depicting an item of cookware, performing one or more operations responsive to the detected item of cookware.

13. The method of claim 12, further comprising, prior to classifying each of the one or more frames, calibrating the system to identify one or more locations respectively associated with one or more burners included in the cooktop, wherein the calibration is performed by comparing reference imagery depicting the cooktop without objects placed thereon with calibration imagery depicting the cooktop with one or more objects respectively placed on the one or more burners.

14. The method of claim 12, further comprising, prior to said segmenting and said classifying, performing a calibration routine to identify the plurality of locations respectively associated the plurality of burners included in the cooktop.

15. The method of claim 14, wherein performing the calibration routine comprises:

obtaining a reference frame of imagery depicting the cooktop without any objects placed thereon;

obtaining one or more calibration frames of imagery depicting the cooktop with a plurality of objects respectively positioned at the plurality of locations respectively associated with the plurality of burners;

performing background subtraction for the one or more calibration frames of imagery with respect to the reference frame of imagery to identify the plurality of locations.

16. The method of claim 15, wherein:

the one or more calibration frames of imagery comprise a single calibration frame of imagery; and performing background subtraction for the single calibration frame of imagery with respect to the reference frame of imagery further comprises performing object segmentation to identify the plurality of locations.

17. The method of claim 14, wherein performing the calibration routine comprises:

obtaining a reference frame of imagery depicting the cooktop without any objects placed thereon;

obtaining one or more calibration frames of imagery depicting the cooktop with the plurality of burners energized; and performing background subtraction for the one or more calibration frames of imagery with respect to the reference frame of imagery to identify the plurality of locations.

18. A system for detecting cookware, the system comprising:

a vision sensor positioned so as to collect imagery depicting a cooktop;

one or more processors; and one or more non-transitory computer-readable media storing instructions that, when executed by the one or more processors, cause the one or more processors to perform operations, the operations comprising:

obtaining a frame of imagery depicting the cooktop;
using a classifier to classify the frame of imagery as either depicting cookware or not depicting cookware, wherein the classifier classifies the frame of imagery as either depicting cookware or not depicting cookware based on a plurality of planes respectively associated with a plurality of image features, wherein the plurality of planes are predetermined based on performance of a classifier training algorithm with respect to a positive training image dataset and a negative training image dataset, wherein the positive image training dataset comprises a plurality of images depicting cookware and the negative image training dataset comprises a plurality of images that do not depict cookware, and wherein the plurality of planes are stored in a system memory; and
when the frame is classified as depicting cookware, performing one or more operations in response to the detected cookware.

19. The system of claim 18, wherein the operations further comprise, when the frame is classified as depicting cookware:
adding the frame of imagery to a positive training image dataset; and
recomputing the plurality of planes.

20. The system of claim 18, wherein:
the operations further comprise segmenting the frame of imagery according to a plurality of burner locations respectively associated with a plurality of burners included in the cooktop, such that a plurality of frame segments of formed that respectively correspond to the plurality of burners; and
using the classifier to classify the frame of imagery as either depicting cookware or not depicting cookware comprises using the classifier to individually classify each of the plurality of frame segments as either depicting cookware or not depicting cookware, such that cookware detection is performed on a burner-by-burner basis.

* * * * *